United States Patent
King et al.

(10) Patent No.: US 10,069,385 B2
(45) Date of Patent: *Sep. 4, 2018

(54) POLE-PIECE BONDING

(71) Applicant: YASA MOTORS LIMITED, Abingdon, Oxfordshire (GB)

(72) Inventors: Charles Edmund King, Oxford (GB); Jonathan James Biddulph, Wallingford (GB)

(73) Assignee: YASA LIMITED, Kidlington (GB)

( * ) Notice: Subject to any disclaimer, the term of this patent is extended or adjusted under 35 U.S.C. 154(b) by 240 days.

This patent is subject to a terminal disclaimer.

(21) Appl. No.: 15/021,208

(22) PCT Filed: Sep. 12, 2014

(86) PCT No.: PCT/GB2014/052774
§ 371 (c)(1),
(2) Date: Mar. 10, 2016

(87) PCT Pub. No.: WO2015/036779
PCT Pub. Date: Mar. 19, 2015

(65) Prior Publication Data
US 2016/0226352 A1  Aug. 4, 2016

(30) Foreign Application Priority Data

Sep. 13, 2013  (GB) .................................. 1316338.1

(51) Int. Cl.
*H02K 15/02* (2006.01)
*H02K 15/12* (2006.01)
(Continued)

(52) U.S. Cl.
CPC .............. *H02K 15/02* (2013.01); *H02K 1/06* (2013.01); *H02K 1/182* (2013.01); *H02K 3/04* (2013.01);
(Continued)

(58) Field of Classification Search
CPC  H02K 1/06; H02K 1/18; H02K 1/182; H02K 5/02; H02K 5/12; H02K 5/128;
(Continued)

(56) References Cited

U.S. PATENT DOCUMENTS 6,492,749 B1 * 12/2002 Shiga ..................... H02K 3/345
310/216.067
7,078,843 B2 * 7/2006 Du ......................... H02K 1/148
310/216.091

(Continued)

FOREIGN PATENT DOCUMENTS

| EP | 2040352 A1 | 3/2009 |
|---|---|---|
| GB | 2468018 A | 8/2010 |
| GB | 2482928 | 2/2012 |

OTHER PUBLICATIONS

Combined Search and Examination Report in related application GB1316338.1 dated Apr. 16, 2014.
(Continued)

*Primary Examiner* — Tran Nguyen
(74) *Attorney, Agent, or Firm* — Meunier Carlin & Curfman LLC

(57) ABSTRACT

We describe a method of manufacturing a housing for the stator of an axial flux permanent magnet machine, in particular a Yokeless and Segmented Armature motor, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction. The method comprises: fabricating a radial wall for said stator housing to be located in said gap between said rotor and said stator by: providing a membrane of fibre-
(Continued)

reinforced polymer material; pressing a set of said stator bars into said membrane of fibre-reinforced polymer whilst said polymer is mouldable, wherein said reinforcement inhibits said stator bars from pushing through said membrane; solidifying said polymer to hold said set of stator bars in their respective positions; and manufacturing said housing using said radial wall.

22 Claims, 6 Drawing Sheets

(51) Int. Cl.
*H02K 1/18* (2006.01)
*H02K 21/24* (2006.01)
*H02K 5/128* (2006.01)
*H02K 1/06* (2006.01)
*H02K 3/04* (2006.01)
*H02K 5/02* (2006.01)
*H02K 15/14* (2006.01)
*B29L 31/00* (2006.01)
*B29C 45/14* (2006.01)

(52) U.S. Cl.
CPC ............... *H02K 5/02* (2013.01); *H02K 5/128* (2013.01); *H02K 15/12* (2013.01); *H02K 15/14* (2013.01); *H02K 21/24* (2013.01); *B29C 45/14786* (2013.01); *B29C 2045/14877* (2013.01); *B29K 2995/0012* (2013.01); *B29L 2031/755* (2013.01); *H02K 15/022* (2013.01)

(58) Field of Classification Search
CPC ........ H02K 5/15; H02K 15/02; H02K 15/022; H02K 15/03; H02K 15/12; H02K 15/14
See application file for complete search history.

(56) References Cited

U.S. PATENT DOCUMENTS

| 2001/0028128 | A1* | 10/2001 | Blanchon ............... B29C 43/183 264/153 |
| 2008/0292858 | A1* | 11/2008 | Dajek ............... B29C 45/14631 428/220 |
| 2009/0001843 | A1* | 1/2009 | Enomoto ............... H02K 1/145 310/257 |
| 2013/0020900 | A1* | 1/2013 | Takeuchi ................ H02K 3/42 310/214 |
| 2013/0062973 | A1* | 3/2013 | Yoshimura ........... H02K 15/022 310/43 |
| 2013/0147291 | A1 | 6/2013 | Woolmer et al. |
| 2016/0226353 | A1* | 8/2016 | Court ............... B29C 45/14467 |
| 2016/0377082 | A1* | 12/2016 | Fecke ................... H02K 5/128 417/420 |

OTHER PUBLICATIONS

International Search Report and Written Opinion in PCT/GB2014/052774, dated Apr. 28, 2015.
English Translation of First Office Action in related CN Application No. 2014800502858, dated Dec. 1, 2017.
International Search Report and Written Opinion, dated Jun. 12, 2015, in PCT Application No. PCT/GB2014/052775.
Non final office action dated Jan. 29, 2018, in U.S. Appl. No. 15/021,203.

* cited by examiner

Torus NS  Torus NN  YASA

POLE-PIECE BONDING

FIELD OF THE INVENTION

This invention relates to methods of manufacturing a housing for the stator of an axial flux permanent magnet machine, more particularly to forming a closely-toleranced integrated structure including magnetic elements; to housings manufactured by the methods; and to machines incorporating the housings.

BACKGROUND TO THE INVENTION

In this specification we are concerned with axial flux permanent magnet machines. Broadly speaking these have disc- or ring-shaped rotor and stator structures arranged about an axis. Typically the stator comprises a set of coils each parallel to the axis and the rotor bears a set of permanent magnets and is mounted on a bearing so that it can rotate about the axis driven by fields from the stator coils. FIG. 1a shows the general configuration of an axial flux machine with a pair of rotors R1, R2 to either side of a stator S—although a simple structure could omit one of the rotors. As can be seen there is an air gap G between a rotor and a stator and in an axial flux machine the direction of flux through the air gap is substantially axial.

There are various configurations of axial flux permanent magnet machine depending upon the arrangement of north and south poles on the rotors. FIG. 1b illustrates the basic configurations of a Torus NS machine, a Torus NN machine (which has a thicker yoke because the NN pole arrangement requires flux to flow through the thickness of the yoke), and a YASA (Yokeless and Segmented Armature) topology. Background prior art relating to YASA motors can be found in our earlier patent published applications, for example WO2010/092402.

The illustration of the YASA topology shows cross-sections through two coils, the cross-hatched area showing the windings around each coil. As can be appreciated, dispensing with the stator yoke provides a substantial saving in weight and iron losses, but drawbacks of removing the stator yoke are a) loss of the structural strength to the stator (which the iron provided) even though there is potentially increased need for strength because of the YASA topology which, being a compact design, can result in very large stresses and b) loss of a route for heat to escape from stator coils. To address both issues, i.e. the high torque density of the YASA design and generation of significant quantities of heat, a housing for the stator should provide great strength and rigidity to address torque demands and should also define a chamber which can be supplied with coolant for the machine. It can further be appreciated from FIG. 1b that for efficient operation (minimum losses in the high reluctance air gap), the gap between the rotor and stator should be as small as possible.

The desired features of a housing for the stator assembly of an axial flux permanent magnet machine, especially one having a YASA topology, impose conflicting requirements. Conventional manufacturing techniques are not able to combine the desired features adequately. General background prior art relating to the production of reinforced articles can be found in, for example, EP0 063 403A; US2001/0028128; and US2008/0292858. We have previously described, in WO2012/022974, a clamshell type housing in which shoes of the stator bars on which the stator coils are wound are overmoulded into the radial wall of the housing. However in practice it has proved difficult to form such a structure. There are particular problems in achieving a very small gap between rotor and stator, preferably around 1.5 mm or less.

SUMMARY OF THE INVENTION

Thus the invention provides a method of manufacturing a housing for the stator of an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising: fabricating a radial wall for said stator housing to be located in said gap between said rotor and said stator by: providing a membrane of polymer material; pressing at least ends or shoes of said set of said stator bars into said membrane of polymer whilst said polymer is mouldable, wherein at least a said end or shoe of a said stator bar is formed from a porous magnetic material; solidifying said polymer to hold said ends or shoes of said set of stator bars in their respective positions; and manufacturing said housing using said radial wall; wherein said polymer of said membrane bonds with said porous magnetic material during said pressing to bond said set of stator bars to said polymer In some preferred embodiments the stator bars are formed from a soft magnetic composite (SMC) material—that is a powdered magnetic material such as iron bonded with a coating of electrically insulating material such as glass. This gives the SMC a relatively high electrical resistivity in combination with good permeability and magnetic saturation and thus this material may be continuous rather than, say, laminated. A stator bar may be manufactured from SMC in three parts, that is a pole piece with a shoe bonded to either end, as previously described. Optionally, as we have described in an earlier patent publication, WO2010/092403, elongate magnetic particles aligned along the coil axes may be employed.

Surprisingly, when a heated SMC stator bar is pressed into a polymer a bond is formed which it is believed (without wishing to be bound by theory) is due to diffusion of the polymer into the stator bar and/or diffusion of the organic material in the SMC into the surface of the polymer membrane.

As previously mentioned, in some preferred embodiments the porous magnetic material comprises soft magnetic composite (SMC). In principle however the same technique may be employed with other magnetic materials from which a stator bar/shoe may be formed, where these materials exhibit some porosity, for example due to lamination. Thus embodiments of the technique also encompass the use of a laminated stator bar/shoe.

In some embodiments substantially a complete face of the end or shoe of a stator bar bonds with the membrane. In other embodiments the membrane is provided with a set of apertures into which the faces of the ends/shoes of the stator bars fit, flush with the far side of the membrane. Then the stator bars, more particularly the ends/shoes, may be provided with a flange or step around the edge of the exposed face (either continuous or located at intervals around the edge). A surface of this flange or step may then bond with a surface of the membrane. Optionally one or more additional laminations may be overlaid over the end/shoes to retain them in place within the radial wall of the machine.

More generally the membrane may be formed from a plurality of lamina, in embodiments fibre-reinforced as described further below. In embodiments the end or shoe of a stator bar is of one piece with the stator bar itself, but potentially the shoe for a stator bar could be bonded to the membrane and then afterwards attached to the core of the stator bar around which the coil is wrapped.

Preferably the membrane is fibre-reinforced: Broadly speaking, the fibre reinforcement of the polymer enables the stator bars, typically with shoes on their ends, to be pressed into the membrane without pushing through the membrane—the reinforcement inhibits the bars from pushing through the membrane. Thus the membrane of fibre-reinforced polymer can be very thin, for example less than 1 mm or less than 0.5 mm thickness. This allows a very accurate control of the thickness of the membrane between the ends (shoes) of the stator bars and the air gap; this thickness may be in the range 1-500 µm, more preferably 1-300 µm. In embodiments the reinforcing fibre may be a plain weave fibre (the weft goes over one warp and under the next). In embodiments the fibre is calendared (treated with pressure/heat between rollers) as this helps to achieve a uniform, thin, membrane thickness. The fibres may comprise, for example, glass, carbon, basalt, or aramid.

Thus a related aspect of the invention further provides a method of manufacturing a housing for the stator of an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap there between in which magnetic flux in the machine is generally in an axial direction, the method comprising: fabricating a radial wall for said stator housing to be located in said gap between said rotor and said stator by: providing a membrane of fibre-reinforced polymer material; pressing a set of said stator bars into said membrane of fibre-reinforced polymer whilst said polymer is mouldable, wherein said reinforcement inhibits said stator bars from pushing through said membrane; solidifying said polymer to hold said set of stator bars in their respective positions; and manufacturing said housing using said radial wall.

Although there can be significant advantage in employing a fibre-reinforced membrane this is not essential, and a membrane without fibre-reinforcement may be employed with careful control of the pressing process.

Optionally embodiments may also include a supplementary film or membrane of resin (polymer) over the fibre-reinforced membrane, and preferably compatible with the membrane polymer. This is useful to provide in-fill between non-coplanar regions of pole shoe and membrane, and to supply resin (polymer) absorbed by pole shoes and flashing during bonding, thus avoiding resin starvation of the fibre-reinforced membrane. Depending on the thickness of the supplementary film or membrane of resin, where present, the pole shoes may be pressed into or through the supplementary film or membrane.

A stator bar in embodiments comprises a pole piece around which the coil is wound, with a pole shoe at either end to spread the field where it crosses the air gap, the increased area reducing the overall reluctance of the gap. Typically the polymer comprises a thermoplastic resin which is heated to become mouldable by heating the stator bar, more particularly the pole shoes, prior to pressing these into the polymer. Advantageously this may be performed by induction heating or laser heating. Alternatively, however, the polymer may be heated separately (to above its glass transition temperature) or, in principle, the polymer may be made mouldable in some other way, for example using a solvent.

A bond formed in the manner described above has proven to be exceptionally strong—stronger than the SMC itself—which is a highly desirable characteristic for the stator housing since this helps to provide substantial support to the stator bars in the finished machine: in effect the stator bars and housing form a unitary construction which substantially enhances the overall strength of the machine. Further embodiments of this method of manufacturing facilitate accurate alignment of the stator bars which may be held, for example, in a jig when pressing them into the polymer. (The skilled person will recognise that in this process it is immaterial whether the stator bars are pressed onto the polymer membrane or vice versa—in either case the stator bars may be pressed into the polymer; the skilled person will also appreciate the possibility of pressing stator bars to a fixed depth and so using un-reinforced polymer).

Fabrication of the radial wall preferably also comprises injection moulding a set of reinforcing features onto the membrane using a thermoplastic polymer bondable when molten with the polymer of the membrane. Preferably the, injection moulded polymer is also fibre-reinforced (with short fibres, for example of order length 1 mm or less, to facilitate flow); these may be of the same materials as previously described. The thermoplastic polymer may be, for example, a high temperature thermoplastic injection moulded resin such as PEEK, PPA or PA66. The machine may operate at an elevated temperature in use, and in some preferred embodiments of the method an in-plane coefficient of thermal expansion (TCE) of the membrane of fibre-reinforced polymer matches a coefficient of thermal expansion of the reinforcing feature (at the same temperature and in the same direction or plane, though this TCE is generally substantially isotropic) to within 8 ppm. The TCE of the membrane preferably also matches the coefficient of thermal expansion of the end (shoe) of a stator bar (in the same direction or plane) to within 5 ppm. This may be achieved by routine experiment, selecting from amongst available polymer materials. In embodiments the polymer of the membrane forming the thin-walled section of the housing may comprise one or more off the following high temperature thermoplastic polymers: PPS (polyphenylene sulfide), PPA (polyphthalamide), PEEK (polyether ether ketone), ABS (acrylonitrile butadiene styrene), and PA (polyamide). However the temperature coefficient of expansion is less important than the stiffness, and preferably an in-plane Young's modulus of the membrane is less than 50 GPa and more preferably less than 20 GPa.

The reinforcing features may comprise radial and/or annular (circumferential) ribs. In some preferred embodiments the reinforcing features define a set of cavities each sized to fit the shoe at the end of a stator bar. Preferably the membrane of polymer is heated prior to the injection moulding, either prior to insertion or in-situ once inserted in the moulding machine, for improved adhesion between the ribs and membrane. In embodiments the thickness of a rib (above the thin membrane) is 3 mm or greater whilst the membrane thickness, as previously mentioned, is less than 1 mm, preferably less than 0.5 mm. Thus the majority of the narrow rotor-stator gap "G" is "air".

Embodiments of the techniques we have described are particularly useful for a yokeless and segmented armature machine, in particular a motor, because they facilitate accurate positioning and support of the stator segments in the absence of a yoke, in particular when the machine is under load. In embodiments the machine may be a motor or generator. Preferably the stator housing comprises a pair of radial walls, one at either end of the stator, linked via a generally cylindrical section. This cylindrical portion may be fabricated from metal, for example aluminium, but in embodiments is preferably injection moulded together with the reinforcing ribs of the radial wall. Thus in embodiments a radial wall and a portion of the length of the cylindrical wall forms a clamshell. Two clamshells mating to provide a closed chamber for the stator within which coolant, for example oil, may be circulated.

In a related aspect the invention provides a stator assembly for an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the stator assembly comprising a stator housing containing said stator, said stator housing having a radial wall comprising a membrane of (preferably fibre-reinforced) polymer to be located in said gap between said rotor and said stator, wherein at least an end or shoe of a said stator bar is preferably formed from soft magnetic composite (SMC), and wherein said polymer of said membrane of (preferably fibre-reinforced) polymer is bonded with said end or shoe to bond said set of stator bars to said membrane.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1A:
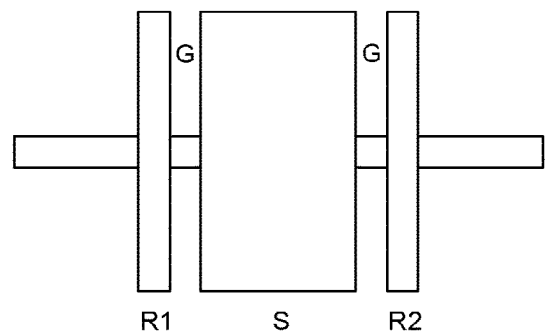
FIGS. 1a to 1c show, respectively, a general configuration of a two-rotor axial flux machine, example topologies for axial flux permanent magnet machines, and a schematic side view of a yokeless and segmented armature (YASA) machine.
Figure 1B:
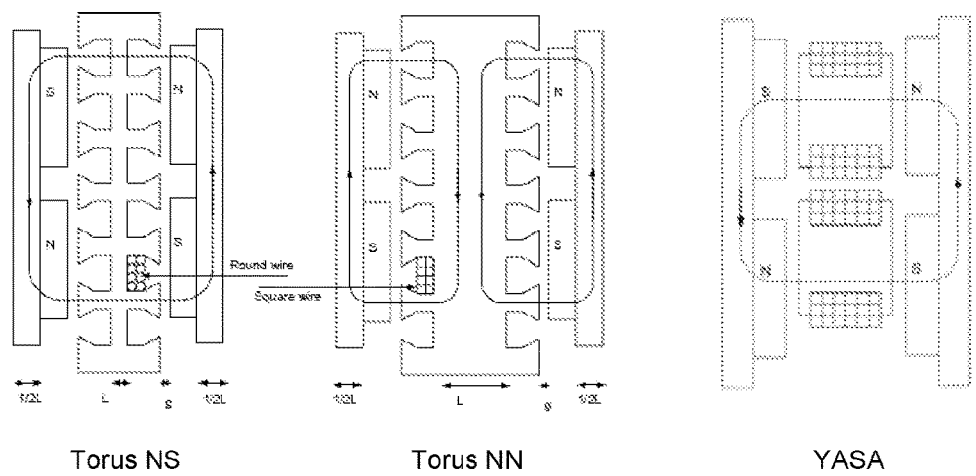
Figure 1C:
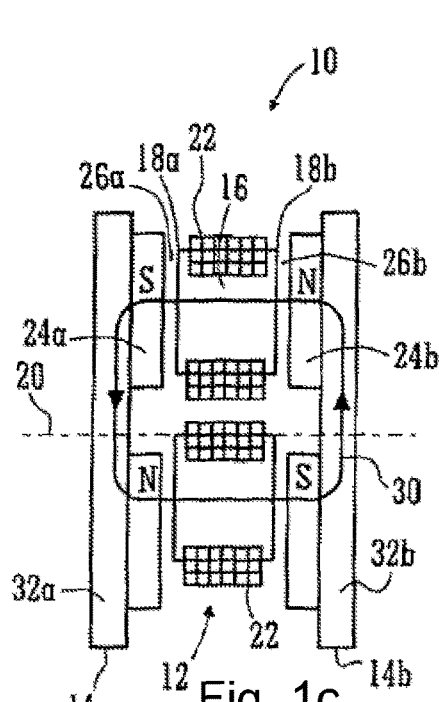
Figure 2:
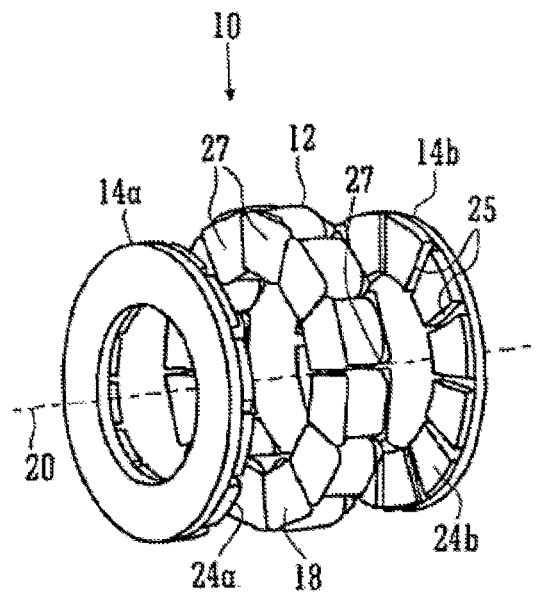
FIG. 2 shows a perspective view of the YASA machine of FIG. 1c.
Figure 3:
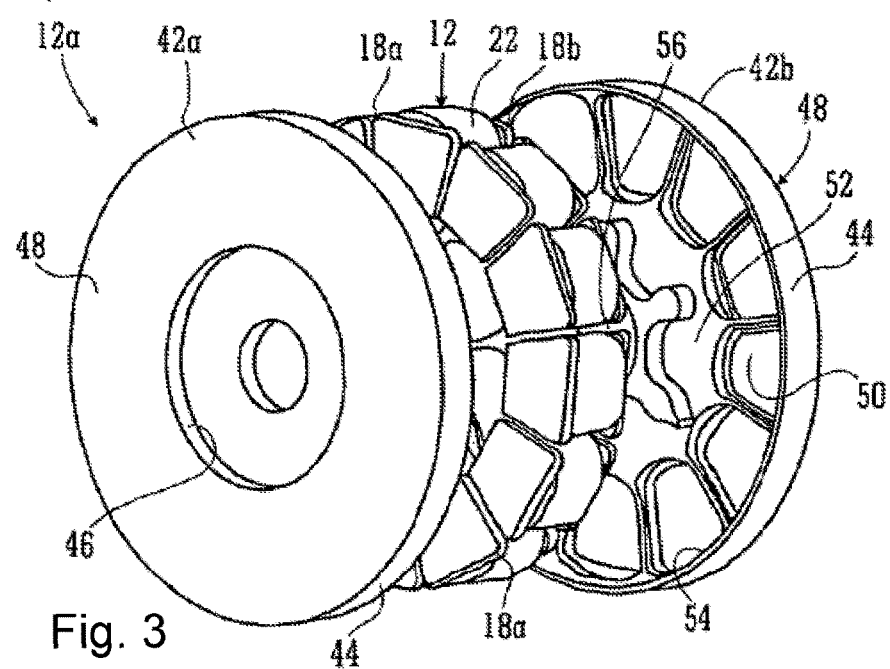
FIG. 3 shows a perspective exploded view of a stator and stator housing for a YASA machine according to the prior art.

Referring first to FIGS. 1c, 2 and 3, which are taken from our PCT application WO2012/022974, FIG. 1c shows a schematic illustration of a yokeless and segmented armature machine 10.

The machine 10 comprises a stator 12 and two rotors 14a,b. The stator 12 is a collection of separate stator bars 16 spaced circumferentially about a rotation axis 20 of the rotors 14a,b. Each bar 16 has its own axis which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22.

The two rotors 14a,b carry permanent magnets 24a, b that face one another with the stator coil 22 between (when the stator bars are inclined—not as shown—the magnets are likewise). Two air gaps 26a, b are disposed between respective shoe and magnet pairs 18a/24a, 18b/24b. There are an even number of coils and magnets spaced around the axis of rotation 20 and, preferably, there are a different number of coils and magnets so that the coils do not all come into registration with the corresponding magnet pair at the same time and at the same rotational position of the rotor with respect to the stator. This serves to reduce cogging.

In a motor the coils 22 are energized so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a, b and which defines a chamber supplied with a cooling medium.

Turning to FIG. 3, a stator 12a is shown in which the stator coils are located between plastics material clam shells 42a, b. These clamshells have external cylindrical walls 44, internal cylindrical walls 46, and annular radially disposed walls 48. In the prior art example of FIG. 3 the radial walls 48 include internal pockets 50 to receive the shoes 18a,b of the stator bars 16 and serve to locate the stator coil assemblies 16, 22, 18a,b when the two clam shell housings 42a, b of the stator 12a are assembled together. The stator housing 42a, b defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42a,b is provided with ports that allow cooling medium such as oil to be pumped into the spaces 52,54,56 to circulate around the coils and cool them.

The coil cores may be laminated with the inter-lamination insulation parallel to the desired flux direction. However advantageously the coil cores may also be formed from soft-iron particles coated with electrical insulation and moulded to a desired shape (soft magnetic composites—SMC), being bound together by the insulation matrix. A high-temperature, high-pressure compaction process is used to mould the component into a complex shape, capable of producing three-dimensional magnetic flux patterns with an excellent form factor and enabling a high fill factor winding to be employed, wound straight onto SMC teeth. Conveniently the shoes and stator bar may be formed separately and subsequently assembled; a shoe may have a central region with an axial direction of minimum reluctance and an outer region with a radial direction of minimum reluctance (see WO2012/022974).

Figure 4A:
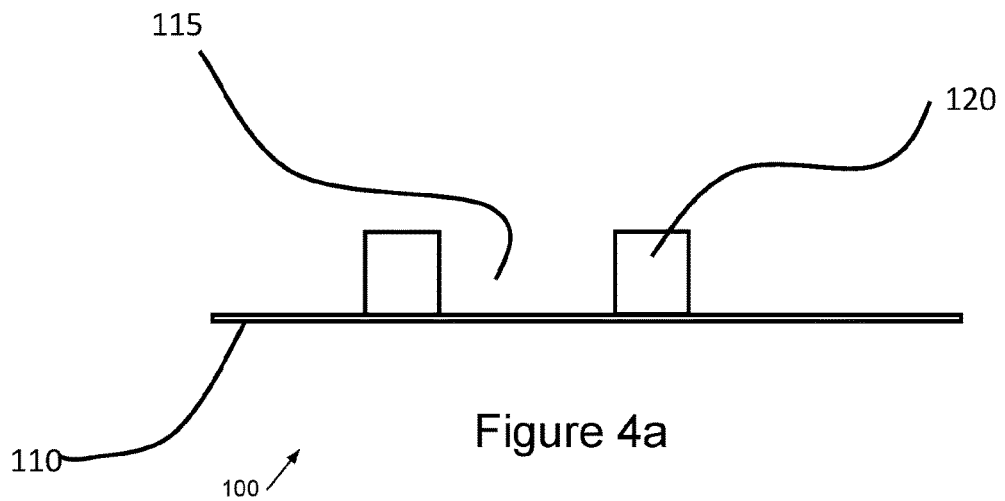
FIGS. 4a and 4b show, respectively, a vertical cross-section view and a view from above of an annular radial wall of a stator housing according to an embodiment of the invention.
Figure 4B:
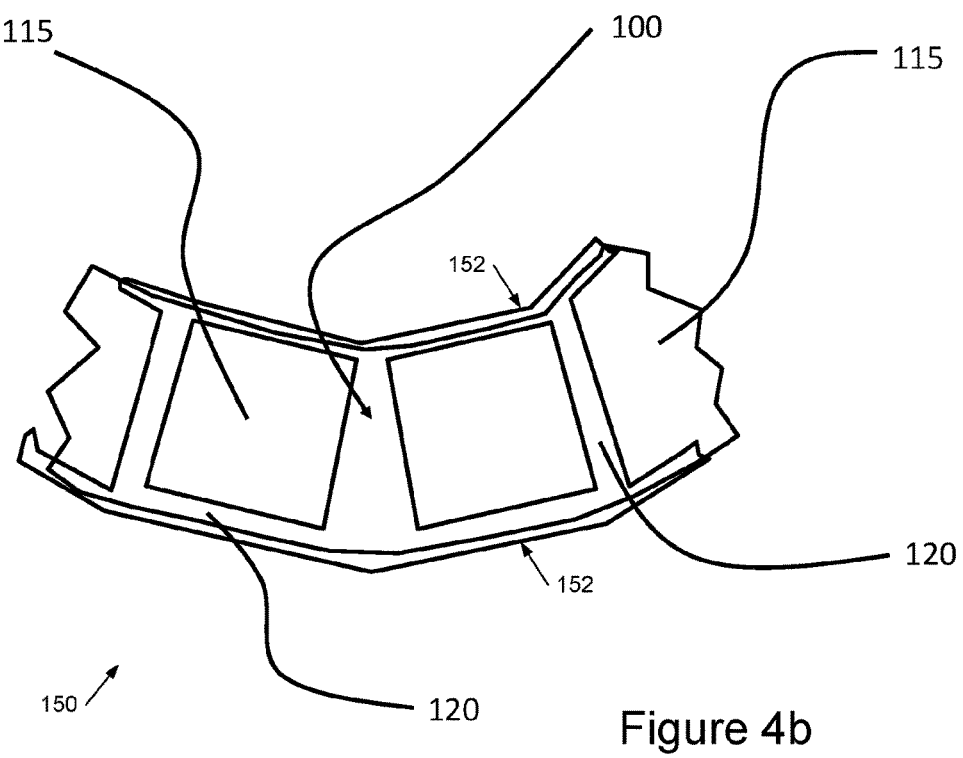

Referring to FIG. 4a, this shows, schematically, a vertical cross-section through the annular, radial wall 100 of an injection moulded stator housing according to an embodiment of the invention. This comprises a thin, reinforced membrane 110 of thermoplastic material onto which has been moulded a set of radial and circumferential reinforcing ribs 120, leaving cavities 115 therebetween to accept shoes of the pole pieces. FIG. 4b shows the same arrangement from above, showing an axial view of one half of a clamshell-type stator housing 150, also illustrating the cylindrical walls 152 of the housing.

Figure 5:
FIG. 5 shows a vertical cross-section through a membrane of fibre-reinforced polymer for use in manufacturing the radial wall of FIG. 4.

FIG. 5 illustrates the membrane of fibre-reinforced thermoplastic starting material in cross-section. This illustrates plain weave reinforcing fibre 160 within the material, impregnated with a thermoplastic resin 170, and calendared to form a uniform thickness membrane. Preferably resin 170 is an "engineering polymer" which is relatively strong at high temperature, for example PPA or PEEK; the glass fibre reinforcement helps to confer toughness and strength. The membrane may have a thickness of, for example, ~0.5 mm.

A process for forming the housing 150, more particularly radial wall 100, comprises inserting this into a mould tool and shutting off the tool so as to form radial and circumferential ribs 120, preferably at least 3 mm thick. These may be formed using a thermoplastic polymer compatible with that of the thin thermoplastic membrane, the ribs being intimately bonded to the membrane during the injection moulding process.

In embodiments of the method, the stator bars, or at least the shoes at the end(s) of the stator bars, are bonded to the membrane forming the radial wall prior to injection moulding the reinforcing ribs. It is therefore preferable for the mould tool to be arranged so that the membrane is supported horizontally in the machine, as the membrane with the stator bars attached is relatively floppy. The membrane with bonded shoes may conveniently be handled magnetically.

The skilled person will recognise it is equally possible to bond stator pole piece 180 to membrane 110 after injection moulding ribs 120 onto membrane 110 as it is to bond stator pole piece 180 to membrane 110 and particularly to membrane polymer 170 prior to injection moulding ribs 120.

Figure 6A:
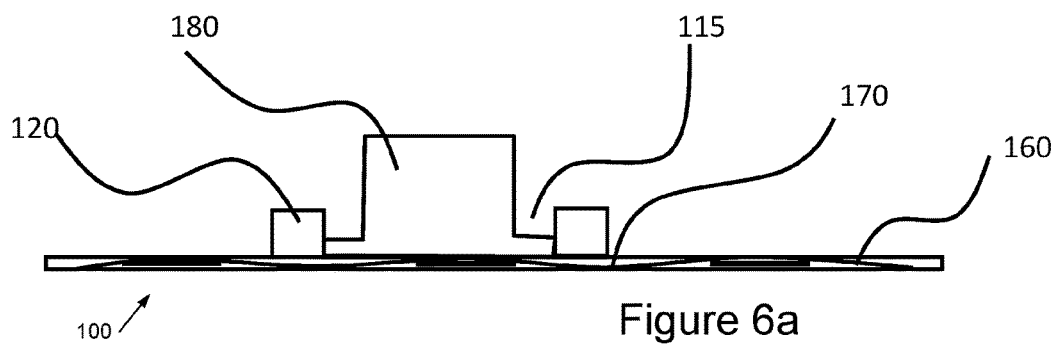
FIGS. 6a and 6b show, respectively, the radial wall of FIG. 5 with a stator pole piece attached, and the radial wall of a stator piece with a supplementary resin film aiding gap filling.

FIG. 6a illustrates the radial wall 100 of FIG. 4 with a stator pole piece 180 bonded into place: the stator pole piece 180 is heated and pressed into the thin membrane 110 but the, for example glass fibre, reinforcement acts as an end stop, preventing the stator pole piece from pushing through the very thin membrane, and maintaining, inter alia, the liquid-proof integrity of the housing for containing coolant oil when in use. Nonetheless, fibre reinforcement is not essential for membrane 110 and, instead, push-through of the stator pole piece 180 may be inhibited by careful control of the pressing of the stator pole piece and/or use of a suitable stop.

Advantageously it has also been found that the relatively small quantity of thermoplastic polymer 170 in the thin membrane 110 is sufficient to form an exceptionally strong bond to SMC pole pieces. However in a related aspect of this process the bonding tends to remove resin from the membrane leaving the fibres apparent on the opposite surface of the membrane, which may no longer be smooth. This can be addressed by including a thin supplementary membrane between the fibre-reinforced membrane and the shoes of the pole pieces, preferably of the same type of resin as the fibre-reinforced membrane, to act as a supplementary resin supply. This also has the advantage that reduced flatness of the shoe faces and/or fibre-reinforced membrane can be accommodated.

Figure 6B:
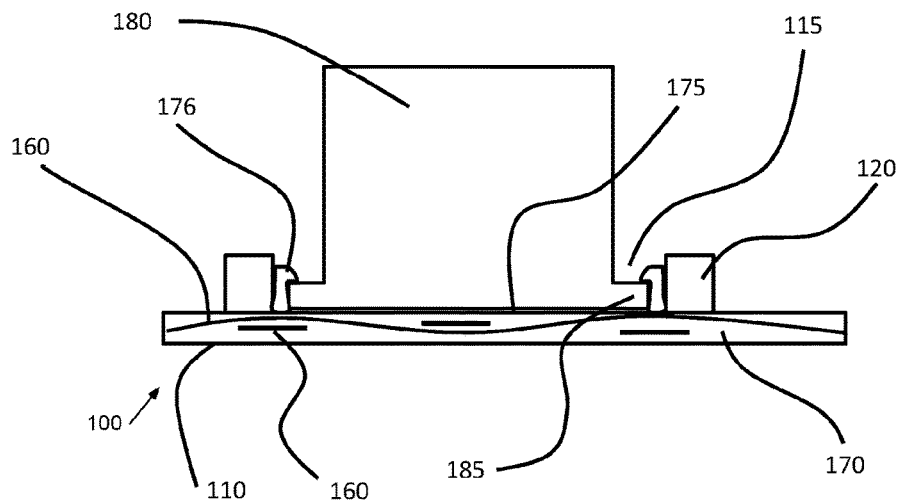

FIG. 6b shows a variant of the structure of FIG. 6a incorporating a supplementary thermoplastic polymer membrane 175 of a compatible resin to resin 170 of membrane 110. This supplementary membrane 175 may have a thickness of order ~0.25 mm, and provides space filling for any unevenness of substrates 180 and 110 and flashing 176 when pole piece 180 is heated and pressed into thin membranes 175 and 110. This flashing helps to augment bonding of the pole shoes and also fills tolerance gaps between ribs 120 and pole shoes 185. The underlying glass reinforcement still prevents push-through when heating the pole shoes, placing these on the unheated thin membrane, and pressing firmly, and the resulting bond strength is stronger than the SMC itself.

An example SMC may comprise glass-bonded iron particles, a thin layer (typically <10 μm) of glass bonding and mutually electrically insulating the iron particles, leaving some residual porosity. Suitable materials are available from, for example, Hoganas AB in Sweden under the trade name Somaloy (registered trade mark). To improve the porosity and hence the bond strength the bonding surface is preferably cleaned of residual traces of carbon from the manufacturing process, for example mechanically and/or using an acid etch.

The resulting structure has a very thin radial wall, as desired, oil integrity, the useful function of holding the pole pieces in their correct relative positions during assembly and, when the structure is fully assembled, provides great strength. As previously described in our WO2012/022974, where a clamshell-type approach is employed the stator bars/pole pieces may be split at some point along their length so that one shoe/stator bar can be attached to each clamshell prior to joining the clamshells and stator bars. Alternatively the stator bars may be assembled onto one clamshell and then the second joined to the first and bonded to the stator bars at the same time, avoiding the need to split the stator bars for a stronger structure. In another, preferred, approach one clamshell has a stator bar and a shoe at one end and the other clamshell has the shoe for the other end of the stator bar (which may be adhesively bonded to the free end of the stator bar on assembly).

Optionally a reinforcing feature or rib may be fabricated from a plurality of lamina, compressed and heated together to mutually bond. Preferably each lamina is fibre reinforced so that the weave extends through substantially the entire radial wall, that is both through the membrane and its reinforcement. Optionally the direction(s) of weave may differ from one lamina to the next.

Figure 7A:
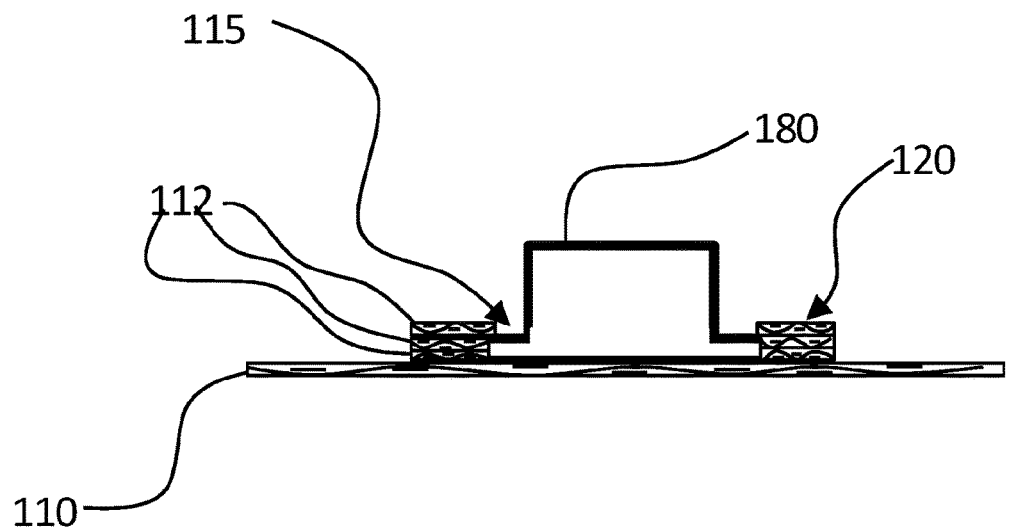
FIGS. 7a to 7c show, respectively, first and second example cross-sections through a radial wall employing laminated reinforcing features, and an exploded 3D view of the laminated reinforcing features prior to assembly.
Figure 7B:
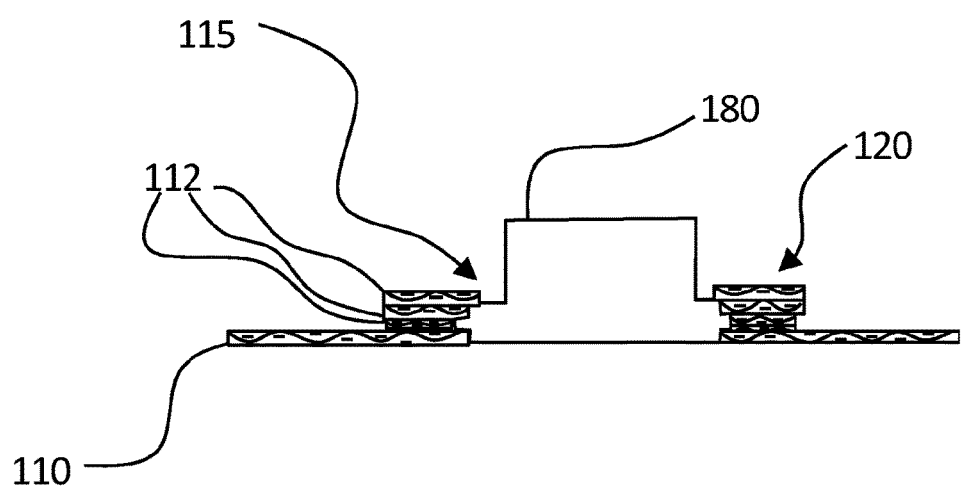
Figure 7C:
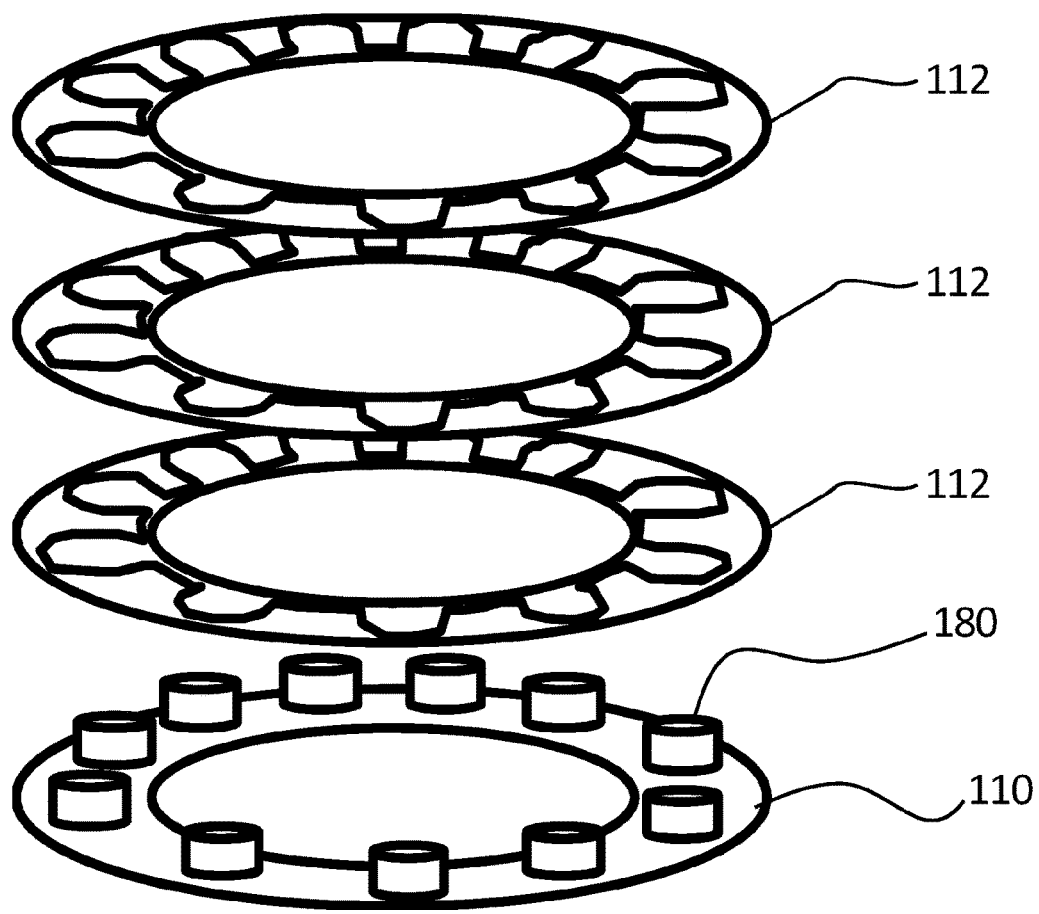

FIG. 7a shows a cross-section through a radial wall fabricated in this way, showing the lamina 112. In FIG. 7a the whole end face of a stator bar, more particularly the show, bonds to the membrane 110. Alternatively, as shown in FIG. 7b, the end face or shoe of a stator bar may fit into an opening in the membrane. In this case the end face or shoe may be provided with a step as illustrated to facilitate bonding to the underlying membrane. Optionally in either case one or more of the lamina may overlay a step or flange of the shoe as shown. FIG. 7c illustrates the lamina 112 in an exploded 3D view.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of manufacturing a housing for the stator of an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising:
fabricating a radial wall for said stator housing to be located in said gap between said rotor and said stator by:
providing a membrane of polymer material;
pressing at least ends or shoes of said set of said stator bars into said membrane of polymer whilst said polymer is mouldable, wherein at least a said end or shoe of a said stator bar is formed from a porous magnetic material;
solidifying said polymer to hold said ends or shoes of said set of stator bars in their respective positions; and
manufacturing said housing using said radial wall;
wherein said polymer of said membrane bonds with said porous magnetic material during said pressing to bond said set of stator bars to said polymer.

2. A method as claimed in claim 1 wherein substantially a complete face of said end or shoe of a stator bar bonds with said membrane.

3. A method as claimed in claim 1 wherein said end or shoe of a stator bar comprises a face with a step or flange around the edge; wherein said membrane has a set of apertures into which said faces of said ends or shoes of said stator bars fit, and wherein said step or flange presses into and bonds with said polymer membrane.

4. A method as claimed in claim 1 wherein, during said bonding, material diffuses between said polymer membrane and said porous magnetic material to bond said membrane with said porous magnetic material.

5. A method as claimed in claim 1 wherein said membrane is a fibre-reinforced polymer material; and wherein during said pressing of said stator bars into said membrane of fibre-reinforced polymer whilst said polymer is mouldable said reinforcement inhibits said stator bars from pushing through said membrane.

6. A method as claimed in claim 1 wherein said porous magnetic material comprises soft magnetic composite (SMC).

7. A method as claimed in claim1 wherein said porous magnetic material comprises laminated magnetic material.

8. A method as claimed in claim 1 further comprising treating a surf ace of at least an end or shoe of a said stator bar to improve the porosity of said end or shoe.

9. A method as claimed in claim 1 further comprising heating said stator bars to make said polymer of said membrane mouldable.

10. A method as claimed in claim 1 wherein an in-plane Young's modulus of said membrane is less than 50 GPa and more preferably less than20 GPa.

11. A method as recited in claim 1, wherein said membrane has a thickness of less than 1 mm, preferably less than or equal to 0.5 mm.

12. A method as recited in claim 1 wherein said membrane polymer comprises one or more of PPS, PPA, PEEK, ABS and PA.

13. A method as claimed in claim 1 wherein said membrane comprises a first, fibre-reinforced thermoplastic polymer, the method further comprising strengthening said membrane of fibre-reinforced polymer by:
placing said membrane of fibre-reinforced polymer into a mould of an injection moulding machine; and
injection moulding a set of reinforcing features onto said membrane using a second thermoplastic polymer miscible when molten with said first thermoplastic polymer.

14. A method as claimed in claim 13 wherein said second thermoplastic polymer is fibre-reinforced with glass fibre, carbon fibre, or aramid fibre.

15. A method as claimed in claim 13, wherein a said stator bar has a shoe at least at one end, and wherein said set of reinforcing features defines a set of cavities for said shoes of said stator bars.

16. A method as claimed in claim 13 further comprising heating said membrane of fibre-reinforced polymer prior to said injection moulding.

17. A method as claimed in claim 13 wherein said radial walls with said reinforcing features hold said stator bars in position during operation of said machine.

18. A method as claimed in claim 13, wherein a said reinforcing feature has a height of at least 3 mm above a plane of said membrane of fibre-reinforced polymer.

19. A method as claimed in claim 1 further comprising providing a supplementary layer of polymer between said stator bars and said membrane prior to said pressing and solidifying.

20. A method as claimed in claim 1 wherein said machine is a yokeless and segmented armature machine having a pair of said rotors, one to either side of said stator, wherein said housing has a pair of said radial walls, one between said stator and each respective rotor, connected by a generally cylindrical wall, and wherein said housing defines a chamber for coolant for said coils of said stator.

21. A method of manufacturing an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising manufacturing a housing for the stator of the machine as recited in claim 1, and using said housing to hold said set of stator coils in place in the machine.

22. A stator assembly for an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the stator assembly comprising a stator housing containing said stator, said stator housing having a radial wall comprising a membrane of fibre-reinforced polymer to be located in said gap between said rotor and said stator, wherein at least an end or shoe of a said stator bar is formed from soft magnetic composite (SMC), and wherein said polymer of said membrane of fibre-reinforced polymer is bonded with said SMC to bond said set of stator bars to said membrane of fibre-reinforced polymer.

* * * * *